United States Patent [19]

Woolley, Jr.

[11] Patent Number: 5,033,785
[45] Date of Patent: Jul. 23, 1991

[54] CLAMP MECHANISM

[76] Inventor: William J. Woolley, Jr., 318 E. Chicago St., Milwaukee, Wis. 53202

[21] Appl. No.: 513,336

[22] Filed: Apr. 20, 1990

[51] Int. Cl.$^5$ ............................................. B25J 15/02
[52] U.S. Cl. ................................... 294/104; 294/116; 414/729; 901/32; 901/39
[58] Field of Search ................. 414/729, 740; 901/32, 901/39; 294/104, 88, 115, 116

[56] References Cited

U.S. PATENT DOCUMENTS

| | | | |
|---|---|---|---|
| 760,582 | 5/1904 | Taylor | 294/115 |
| 3,630,391 | 1/1969 | Wilson | 294/116 X |
| 4,531,772 | 7/1985 | Ronconi | 294/115 |
| 4,744,596 | 5/1988 | Hiller et al. | 294/88 |
| 4,835,844 | 6/1989 | Gerst et al. | 29/747 |

Primary Examiner—Robert J. Spar
Assistant Examiner—Donald W. Underwood

[57] ABSTRACT

A clamp mechanism (20) for holding and transporting parts such as wire (16) and terminals (18) to connector blocks (12) where transport paths require precision and limited space includes a scissors-like clamp (42,52) confined in a housing (24–28) with such clamp driven to move and close by toggle/cam (60,38) in a single sided movement by a single driving mechanism such as a pneumatic cylinder (22), and to open upon the reverse stroke by a spring (66) all defined by a single reciprocating stroke of the driving mechanism.

4 Claims, 3 Drawing Sheets

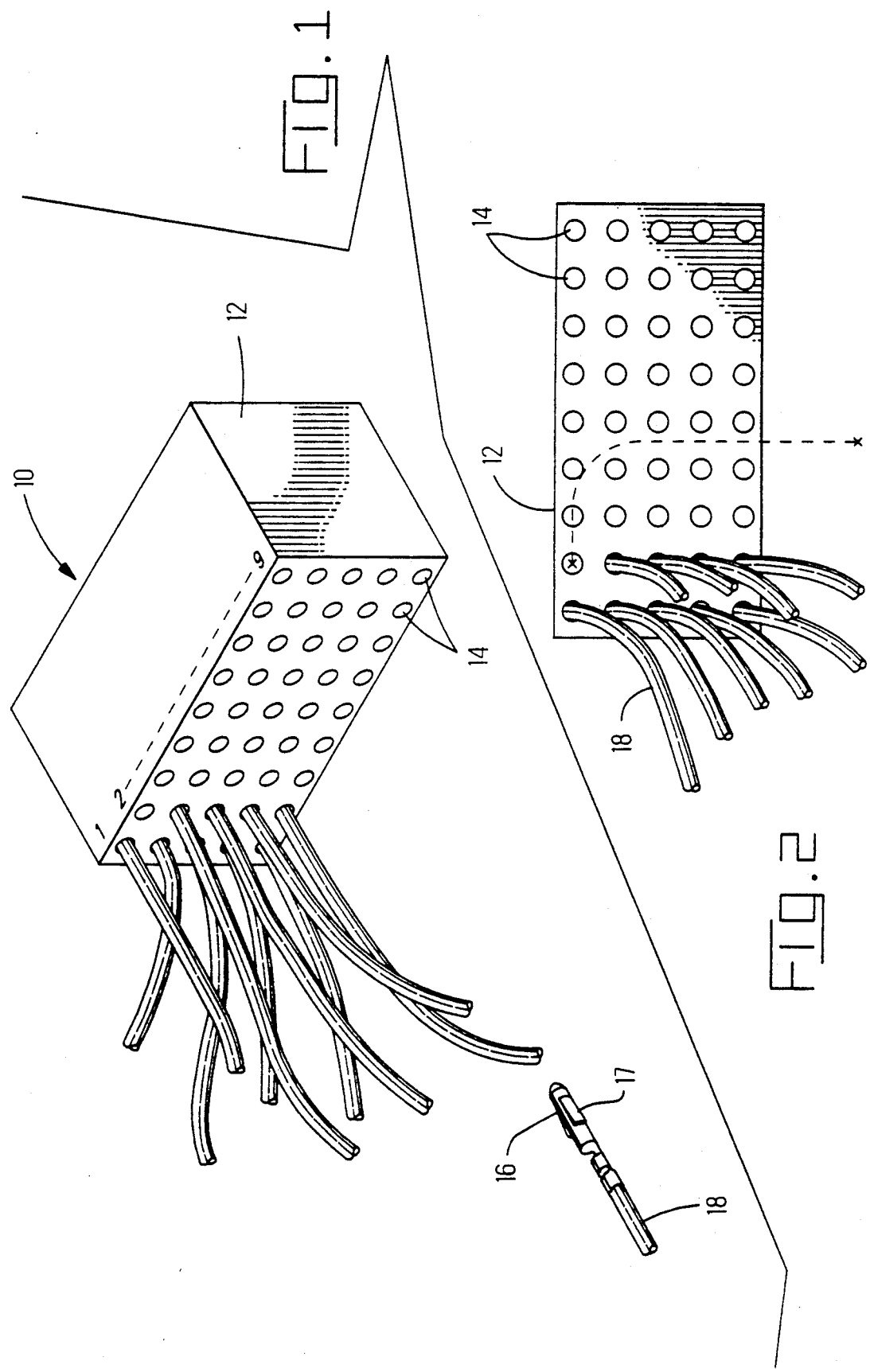

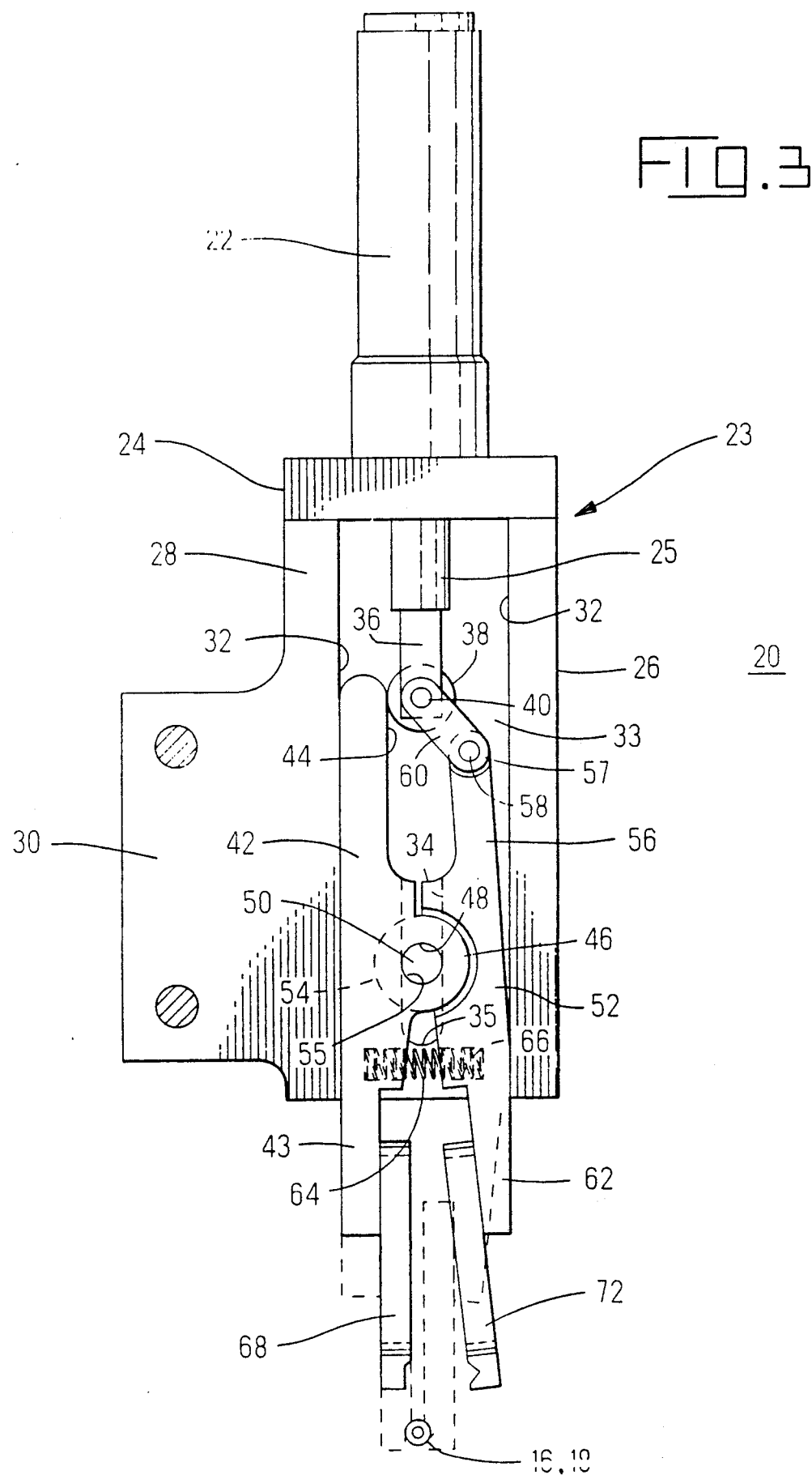

CLAMP MECHANISM

This invention relates to a clamp mechanism for holding and transporting articles including a pneumatic drive means and a toggle/cam action providing a limited functional profile.

BACKGROUND OF THE INVENTION

Automated production of assemblies requires the use of clamping mechanisms operable to clamp articles to be assembled and move or transport them to a further station. Thus, for example, in harness making wherein terminated leads are inserted into connector blocks to assemble harnesses, clamping mechanisms must operate to grasp and firmly hold terminals and wires and move such in precise paths of movement. U.S. Pat. No. 4,835,844 granted June 6, 1989, and directed to a block loading apparatus, teaches loading electrical terminals attached to leads into cavities of electrical connector blocks. The apparatus uses a plurality of clamps which must grasp, hold and transport terminals and leads for this purpose. The clamping mechanism shown in this patent utilizes a wedge driven between two clamps spring loaded to be biased apart with each clamp element mounted for pivotal movement responsive to engagement by a wedge element. Both clamps move and a number of different clamps and transport movements are employed to effect block loading.

It is an object of the present invention to provide a clamping mechanism which provides compound movement to hold and transport articles through a single driving stroke by a single driving mechanism. It is a further object to provide a clamping mechanism which is simpler in operation than heretofore available and which can be operated at high speeds and thus facilitate higher speeds of production. It is a final object of this invention to provide a clamping mechanism of reduced profile during operation for use in tight quarters.

SUMMARY OF THE INVENTION

The present invention achieves the foregoing objectives and overcomes problems of the prior art to grasp or hold and transport parts such as the wire and terminal parts. The mechanism includes a clamp housing containing a pair of clamp elements confined therein for sliding movement in an up and down sense with one of the clamp elements restrained against horizontal movement and the other element driven to reciprocate in closure as the two elements are driven to effect both closure and capture of an article and transport as held between ends of the clamp. A spring normally biases the clamp elements apart. A driving means such as a pneumatic cylinder is made to carry a roller or follower on the end thereof to engage an interior surface of one of the clamp elements and hold such element fixed against horizontal movement while allowing such element to move vertically within the housing. A toggle mechanism connected for pivotal movement adjacent the roller is further connected to the upper end of the other clamp element so as to drive the upper end of that clamp element outwardly at a precise point of downward movement of the drive mechanism and the roller. The toggle mechanism drives the other clamp element to close at its opposite end against the one clamp to hold the article for transport to a position for release. Release occurs upon initiation of the retractional upward stroke of the mechanism under bias of the spring element which forces the clamps apart. The clamp elements bear upon each other through a pin extended through the clamp elements and through the sidewall of the clamp housing via a slot therein. The pin limits downward movement of the clamp elements by engagement with an end of the slot.

By fixing one of the clamp elements against horizontal movement the clamp can be made to operate within a row of wires and leads to one side of the clamping mechanism which would otherwise be interfered with by the clamps in operating proximate to such other wires. The invention operates to effect the clamping and transport necessary to hold and move an article through the operation of a single driving means in a single reciprocating stroke. It does so over a very short length of stroke and thus allows high speed repetitious cycling of the mechanism in performing its function and further does so with very few moving parts and minimal frictional sliding engagement.

BRIEF DESCRIPTION OF THE DRAWINGS

FIG. 1 is a schematic and perspective view of a connector block having rows of apertures therein with the left hand rows having terminated wires therein.

FIG. 2 is an elevational view of the block of FIG. 1 with clamp movement necessary for block loading shown in phantom.

FIG. 3 is an elevational side view of the clamping mechanism of the invention in its upward or retracted condition of displacement with the downward displacement shown in phantom.

DETAILED DESCRIPTION OF THE INVENTION

Figure 4:
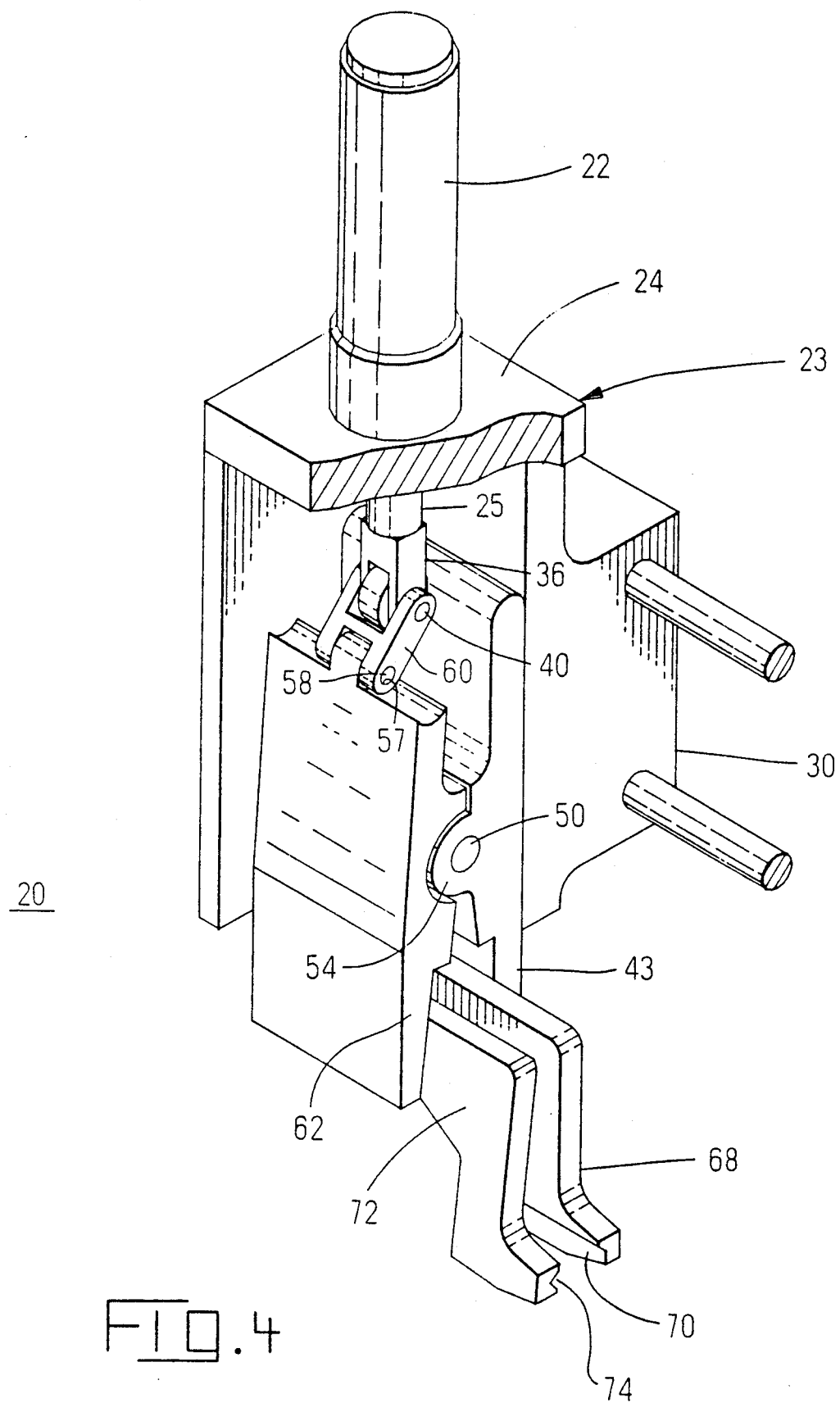
FIG. 4 is a perspective of the mechanism of FIG. 3.

Referring to FIG. 1 there is shown a harness unit 10 comprised of a connector block 12 apertured as at 14 to receive terminals inserted and carried therewithin, the terminals are shown as 16 terminated to wires 18. Blocks such as 12 are typically made of engineering plastic materials molded to have a variety of apertures or cavities in accordance with their functional use; blocks with as few as a single aperture and with as many as several hundred apertures may be found in use. The apertures 14 are frequently but not always arranged in rows and columns, the illustrative example shown in FIG. 1 including five apertures per row with there being nine columns of apertures. Terminals such as 16 have a wide variety of shapes coming in both male and female geometries and are found joined to wires 18 as by crimping or soldering or some other process. Terminals 16 typically include latch elements 17 which hold 16 within aperture 14. The wires 18 are most typically formed of stranded flexible wire covered over with a dielectric and insulating material. Machines are well known which automatically produce leads comprised of terminals and wire at one or at both ends which must be inserted within blocks to form a harness unit.

FIG. 2 shows an aspect of the block loading task which in this case presumes a loading beginning with the left handed column and the bottom aperture and following in a sequence upwardly until such column is loaded as in column 1 in FIG. 1. Loading subsequently begins with the bottom aperture in the next adjacent column, column 2, and proceeds upwardly in a sequence. As block loading occurs there is a need for the device holding the lead to move in a pattern to clear the preceding wire and terminal location and additionally to preclude the left handed loaded column which would otherwise interfere with release of the wire and terminal following loading. The necessary path for loading in the subsequent step is shown in phantom in FIG. 2. The problem with loading is aggrevated when the apertures are on close centers as is required for high density packaging of connectors and cable.

With respect to the foregoing problem, it is desirable that the process of grasping the terminal and lead and displacing such into a position of loading and loading such followed by release and return to a point ready for the next cycle of operation occur rapidly and accurately. Both factors relate directly to the cost of production. It is also apparent that the system of clamping in terms of complexity, reliability of grasping and transport and short duration of cycle are all important. With respect to the operation heretofore described, one practice utilizes means to move a block 12 into position and to index such block from right to left and up and down as a given column is loaded in order to present the next column for loading. While the block, terminal and wire heretofore described are as shown, other configurations of not only blocks and terminals and wires but a wide variety of articles which must be grasped, held and transported are contemplated for use with the present invention. In this regard the terms grasped or held include the function of loosely grasping or holding articles which may be moved through the fingers of the clamp.

Referring now to FIG. 3, an assembly is shown which includes a clamping mechanism 20 intended to effect grasping, holding and transport of articles in a precision action. FIG. 4 shows one version of end tooling including a finger 68 recessed as at 70 and a finger 72 recessed as at 74 which provide holding of terminals 16 or in an alternative embodiment of a wire 18. The surfaces 70 and 74 may be given interior shapes to fit the particular application, terminal or wire or indeed other article. Further, these fingers may be made to include guide surfaces for loosely holding and guiding terminals to permit movement along the surfaces.

Referring now to the mechanism 20 it may be seen to include a driving means 22 in the form in a preferred embodiment of an air cylinder. Driven by a source of air not shown in turn controlled by controls not shown to operate in a manner to drive an output shaft 25 in reciprocating movement upwardly and downwardly or in a vertical sense with respect to the view of FIG. 3. In this regard the terms upwardly, downwardly and vertically are to be understood as relative terms to distinguish them from horizontal or sideways movement or displacement; all with the understanding that the entire mechanism could be oriented in any suitable attitude with respect to its environment to serve its function. In such other attitudes it may be necessary to utilize further holding or guiding of the article once release is effected.

The air cylinder 22 is mounted to the top of a mechanism housing 23, the top including a plate 24 fastened to sidewalls 26 and 28 which extend downwardly, sidewall 28 including a mounting flange 30 allowing the mechanism to be mounted to assembly equipment. The interior of the mechanism housing 23 includes spaced apart sidewalls 32 which are preferably finished and polished for reduced friction and are spaced apart to control the movement of clamps therewithin as viewed in FIG. 3. Housing 23 includes a rear wall 33 slotted as at 34 in a vertical sense with a slot end 35 positioned as shown. A link 36 is fastened to the driving portion 25 of the cylinder 22. The end of 36 carries a roller 38 mounted in the end of the shaft by a pin 40. The roller serves as a follower and is driven in reciprocating vertical movement by 22, its upward or retracted position being shown solidly in FIG. 3. One of two clamp elements 42 is shown to include an interior vertical surface 44 positioned to be in bearing engagement with roller 38, the roller holding clamp 42 fixed against horizontal movement as the roller is driven upwardly and downwardly within housing 23. Clamp element 42 ends in a projection 43 fixed to finger 68. Clamp element 42 further includes a bearing structure 46 apertured as at 48 to receive a pin element 50 which is made to fit within and extend through the sidewall 33 of housing 25 within the slot 34 thereof. Opposite 42 is a further clamp element 52 which includes a bearing structure 54 apertured as at 55 to receive the pin 50 in bearing engagement. Clamp element 52 includes an upper end 56 apertured as at 57 to receive a pin 58 tying the clamp to a toggle link 60. Link 60 is also tied by pin 40 to the end of shaft 36. Clamp element 52 is dimensioned along the portion 56 to provide a clearance between the outside surface of 52 and the interior wall surface 32 of housing 25 in the upward or retracted position. The lower end of clamp element 52 shown as 62 is in the upward position made to bear against the surface 32, driven thereagainst by a spring 64 fitted within an aperture 66 in 52 and a similar aperture within 42. For the purpose of function and description the tooling fingers 68 and 72 with their details for article engagement may be considered as mere extensions of the portions 43 and 62 of elements 42 and 52.

In operation beginning with the mechanism in the open position shown solidly in FIGS. 3 and 4 a suitable signal causes operation of cylinder 22 to displace shaft 25 and shaft 36 downwardly, the roller 38 as heretofore mentioned holding clamp 42 against the interior of housing 25 and the spring 64 holding clamp elements 42,52 outwardly. The clamp elements 42 and 52 are then driven downwardly within 23. The clamp mechanism is in the open position to receive an article such as a terminal 16 or a wire 18 fed into a position beneath the clamp prior to actuation of the cylinder. As the clamp descends, pin 50 strikes surface 35 halting downward movement and toggle 60 drives the clamp to close fingers 68 and 72. The article is thus grasped and held as shown in phantom in FIG. 3 whereupon means not shown can effect a transfer of the article by either displacement of the entire mechanism 20 or grasp the article for transfer. This is followed by subsequent cycling upwardly of the mechanism. When this upward stroke takes place, toggle 60 is rotated with the initial movement of shaft link and the spring element 64 drives the clamp apart. The length of toggle 60 is controlled to effect this action.

The article is thus released and the clamp is returned to the initial position shown in FIG. 3. A simple reciprocating up and down movement of the mechanism, operates to drive shaft, toggle, clamp, finger elements to effect a first downward movement and then a closure of the clamp to grasp an article; and then upward movement to release the article. All the functioning parts are held precisely by solid surfaces. In a working embodiment the length of stroke for the mechanism was on the order of 0.470 inches, a very short stroke compared to many other mechanisms.

In an actual embodiment the device housing was formed of machine steel with the working surfaces polished to a suitable finish to minimize frictional forces with the pins and bearings suitably finished for frictional reduction assuming normal lubrication.

The invention has been illustrated in terms of use to grasp, hold and transport articles such as electrical terminals, wires, relative to block loading. It is to be understood that such use with other articles for the same sort of movement and function are contemplated and the definition of invention should be left to the appended claims.

I claim:

1. A clamping mechanism for holding and transporting small parts in a precision high speed action comprising a pair of clamp elements and drive means operable in a downward stroke to close said elements to close on said part and in an upward stroke to open the said elements to release said part, a clamp housing having said clamp elements fitted therein for sliding vertical movement, said housing means fixing one of said clamp elements against movement transverse to said vertical movement in conjunction with follower means engaging an interior wall of said one element and driven by said driving means, a toggle connected to said driving means to drive the other of said clamp elements horizontally to displace end portions toward the end portions of the one clamp element to effect the clamping of the part with the said housing interior surface limiting closure movement of the other element, the clamp elements having surfaces to carry a part when closed and spring means operable to open said clamp elements upon reversal of said drive means and retraction of said clamp elements during said upward stroke to release said part.

2. The mechanism of claim 1 further including a slot in said housing and a pin element slidably engaging said slot and limited thereby by the end thereof to limit the downward stroke of said clamp elements.

3. A clamping mechanism for holding and transporting small parts including drive means operable to reciprocate in a downward stroke and in an upward stroke over a given length of stroke, housing means having interior walls and a pair of clamp elements held therein for sliding downward and upward movements by the interior walls thereof and for relative pivotal movement by a pin engaging a slot in said housing means with said pin engaging an end of said slot to limit downward movement of said clamp elements and define said given length at one end of said stroke, means operable upon initiation of said downward stroke to hold said clamp elements open at one end to receive a part therebetween and operable at the end of downward movement to close said elements to grasp said part, said means including a spring means biasing said clamp elements apart and a toggle link operable to drive said clamp elements to effect closure, further means operable to hold one of said clamp elements against movement transverse to said downward and upward movements, including a follower means engaging an end of said one of said clamp elements attached to said drive means.

4. The mechanism of claim 3 characterized in that said toggle includes a link pivotally joined to the ends of the other of said clamp elements and said driving means via pin means with said link being of a length relative to the stroke of said driving means to initiate closure of said clamp elements at the end of the downward stroke thereof and permit opening of said clamp elements upon the initiation of the upward stroke of said clamp elements under drive of said spring means.

* * * * *